United States Patent
Segar

[11] Patent Number: 6,067,208
[45] Date of Patent: May 23, 2000

[54] ADJUSTMENT FEATURE FOR LOAD/ UNLOAD ALIGNMENT RAMP ASSEMBLY

[75] Inventor: Peter Raymond Segar, Burnsville, Minn.

[73] Assignee: Seagate Technology, Inc., Scotts Valley, Calif.

[21] Appl. No.: 09/078,857

[22] Filed: May 14, 1998

Related U.S. Application Data

[60] Provisional application No. 60/065,904, Nov. 17, 1997.

[51] Int. Cl.[7] ........................................... G11B 5/54
[52] U.S. Cl. .............................................. 360/105
[58] Field of Search ............................ 360/97.01, 98.01, 360/104, 105

[56] References Cited

U.S. PATENT DOCUMENTS

| | | | |
|---|---|---|---|
| 4,933,785 | 6/1990 | Morehouse et al. | 360/78.04 |
| 5,034,837 | 7/1991 | Schmitz | 360/105 |
| 5,235,482 | 8/1993 | Schmitz | 360/97.02 |
| 5,455,723 | 10/1995 | Boutaghou et al. | 360/75 |
| 5,486,964 | 1/1996 | Morehouse et al. | 360/105 |
| 5,644,451 | 7/1997 | Chan et al. | 360/105 |
| 5,864,448 | 1/1999 | Berberich | 360/105 |
| 5,870,259 | 2/1999 | Alt et al. | 360/105 |
| 5,875,072 | 2/1999 | Brooks, Jr. et al. | 360/104 |
| 5,875,074 | 2/1999 | Ho et al. | 360/105 |

*Primary Examiner*—Jefferson Evans
*Attorney, Agent, or Firm*—Schwegman, Lundberg, Woessner & Kluth, P.A.

[57] ABSTRACT

A disk drive system includes a base, a disk stack rotatably attached to the base, and an actuator assembly movably attached to the base. A ramp assembly includes a set of ramps for loading and unloading the transducing elements to and from the disks in the disk stack. The ramp assembly is attached to the base. The ramp assembly has a series of fixed ramps which are either formed as one integral unit or formed of separate portions. The actuator assembly includes a set of arms. Attached to each arm is a suspension. Attached near the free end of each of the suspensions is a transducer. Also attached to the suspension is a load tang. The load tang rides over the surface of the ramp when the transducers are loaded to or unloaded from a disk surface. The load tang includes a plastically deformable portion which may be irreversibly deformed during assembly of the drive and more particularly, deformed when all of the heads are unloaded from the disk to the ramp assembly for the first time. The deformable portion would allow for z-height adjustment and attitude adjustment of the arm necessary to adjust for stack up tolerances of the various components of the disk drive. The load tang could be finely adjusted and properly mated with the ramp as installed in the disk drive. The deformable region of the load tang could be a formed feature in the body of the tang, or a plastically deformable material within the body of the load tang. Still another embodiment includes a thermoset polymer to be attached along a portion of the load tang. After plastic deformation and adjustment to allow the actuator arm to properly mate with the ramp structure, the thermoset polymer can be heated to allowed to cool while engaged to permanently set the adjustment between the load tangs and the ramps of the ramp assembly.

19 Claims, 4 Drawing Sheets

ADJUSTMENT FEATURE FOR LOAD/ UNLOAD ALIGNMENT RAMP ASSEMBLY

RELATED APPLICATION

This application claims the benefit of U.S. Provisional Application Ser. No. 60/065904, filed Nov. 17, 1997 under 35 USC119(e).

FIELD OF THE INVENTION

The present invention relates to the field of mass storage devices. More particularly, this invention relates to a disk drive which includes a number of ramps for loading and unloading a number of transducing heads.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk containing the recording medium that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block of material, commonly referred to as a slider. The slider is passed over the disk in a transducing relationship with the disk. The transducer can be used to read information representing data from the disk or write information representing data to the disk. When the disk is operating, the disk is usually spinning at relatively high RPM. These days common rotational speeds are 7200 RPM. Some rotational speeds are as high as 10,000 RPM. Higher rotational speeds are contemplated for the future. These high rotational speeds place the slider in high air speeds. The slider is usually aerodynamically designed so that it flies over the disk. The best performance of the disk drive results when the transducer is flown as closely to the surface of the disk as possible. Today's slider is designed to fly on a very thin layer of gas or air. In operation, the distance between the slider and the disk is very small. Currently "fly" heights are about 1–2 micro inches. In some disk drives, the transducer does not fly on a cushion of air but rather passes through a layer of lubricant on the disk.

Information representative of data is stored on the surface of the disk. Disk drive systems read and write information stored on tracks on disks. Transducers, in the form of read/write heads, located on both sides of the disk, read and write information on the disks when the transducers are accurately positioned over one of the designated tracks on the surface of the disk. The transducer is also said to be moved to a target track. As the disk spins and the read/write head is accurately positioned above a target track, the read/write head can store data onto a track by writing information representative of data onto the disk. Similarly, reading data on a disk is accomplished by positioning the read/write head above a target track and reading the stored material on the disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

One of the most critical times during the operation of a disk drive is just before the disk drive shuts down. The slider is typically flying over the disk at a very low height when shutdown occurs. In the past, the slider was moved to a non data area of the disk where it literally landed and slid to a stop resting on the surface of the disk. Problems arise in such a system. When disks are formed with a smooth surface, stiction may result between the slider and the disk surface. In some instances, the force due to stiction is large enough to rip the head away from the suspension. Amongst the other problems was a limited life of the disk drive. Each time the drive was turned off another contact-start stop cycle would result. When shutting down a disk drive, several steps are taken to help insure that the data on the disk is preserved. In general, the actuator assembly is moved so that the transducers do not land on the portion of the disk that contains data. There are many ways to accomplish this. A ramp near the edge of the disk is one design method that has gained industry favor more recently. This method is commonly referred to as ramp load. Disk drives with ramps are well known in the art. U.S. Pat. No. 4,933,785 issued to Morehouse et al. is one such design. Other disk drive designs having ramps therein are shown in U.S. Pat. Nos. 5,455,723, 5,235,482 and 5,034,837.

Typically, the ramp is positioned to the side of the disk. A portion of the ramp is positioned over the disk itself or adjacent to the disk. In operation, before or just after power is actually shut off, the actuator assembly swings the suspension or another portion of the actuator assembly up the ramp to a park position at the top of the ramp. When the actuator assembly is moved to a position where parts of the suspension are positioned on the top of the ramp, the sliders do not contact the disk. Commonly, this procedure is known as unloading the heads. Unloading the heads helps to insure that data on the disk is preserved since, unwanted contact between the slider and the disk may result in data loss on the disk A feature is provided on the suspension or actuator assembly to ride up the ramp to lift the heads off the disk. This feature may generally be referred to as a load tang. In other drives, the ramp may be positioned such that the suspension rides up and down the ramp to unload and load the disk or disks of the disk drive.

Associated with each disk surface is a ramp. A load/ unload structure must therefore be formed having multiple ramps which are registered to the disk surfaces of each disk in the disk stack. Many of the components of the drive are made from separate parts. For example, the disk stack is formed on a hub from a number of disks and spacers. Each disk and each spacer has a tolerance. The tolerances can stack up differently for each disk stack assembly. Similarly, there are stack up tolerances associated with other components made from separate parts, such as the load/unload mechanism, and the E-block which holds all the separate head gimbal assemblies.

Overcoming tolerance problems is a constant problem faced in designing and assembling disk drives. The placement of ramps near the disks is one area of the drive where potential tolerance mismatches may cause problems. The E-block can be formed of separate parts. The E-block holds all the transducing heads over the disk surfaces. The E-block is another potential problem with respect to stack up tolerances. When the E-block is moved to unload or load the heads onto the disks in the drive, three components meet. Each of the three may have a potential stack up tolerance mismatch with respect to the other components.

As a result of potentially having three separate components with separate stack up tolerances meeting, there is a possibility that tolerance mismatches would result in interference between components. For example, a suspension attached to an arm of the actuator may strike the end of a ramp rather than ride up the ramp surface. As a result, there is a need for a system which has some adjustability. This is further necessary in light of the fact that as interdisk spacing gets smaller, the tolerances associated with the disk stack are becoming tighter. In addition, the components are becoming much more sensitive to slight shock loading or to thermal effects. The sliders which contain a transducer are now smaller than ever before. Gimbal springs must allow for gimballing of the sliders and are therefore much more sensitive to slight shock loading. A slight shock load can effect a suspension so that the z-height may be off slightly. Similarly, small tilt angles can result in the arms of the actuator. Since the components are more sensitive to such changes, it is necessary to also allow for some adjustability in one or more components of the actuator. Lastly, the flying height of the slider is heavily influenced by the static attitude of the head.

SUMMARY OF THE INVENTION

A disk drive system includes a base, a disk stack rotatably attached to the base, and an actuator assembly movably attached to the base. A ramp assembly includes a set of ramps for loading and unloading the transducing elements to and from the disks in the disk stack. The ramp assembly is attached to the base. The ramp assembly has a series of fixed ramps which are either formed as one integral unit or formed of separate portions. The actuator assembly includes a set of arms. Attached to each arm is a suspension. Attached near the free end of each of the suspension is a transducer. Also attached to some part of the suspension is a load tang. The load tang rides over the surface of the ramp when the transducers are loaded to or unloaded from a disk surface. The load tang includes a plastically deformable portion which may be deformed during assembly of the drive and more particularly, deformed when all of the heads are unloaded from the disk to the ramp assembly for the first time. The deformable portion would allow for z-height adjustment and attitude adjustment of the arm necessary to adjust for stack up tolerances of the various components of the disk drive. The load tang could be finely adjusted and properly mated with the ramp as installed in the disk drive. The deformable region of the load tang could be a formed feature in the body of the tang, or a plastically deformable material within the body of the load tang. Still another embodiment includes a thermoset polymer to be attached along a portion of the load tang. After plastic deformation and adjustment to allow the actuator arm to properly mate with the ramp structure, the thermoset polymer can be heated to allowed to cool while engaged to permanently set the adjustment between the load tangs and the ramps of the ramp assembly.

Advantageously, such a system allows the adjustability necessary for proper mating of an actuator having a plurality of arms, load beams and transducers, to a multidisk stack. This system provides load and unload capability to drives having a multidisk disk stack.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
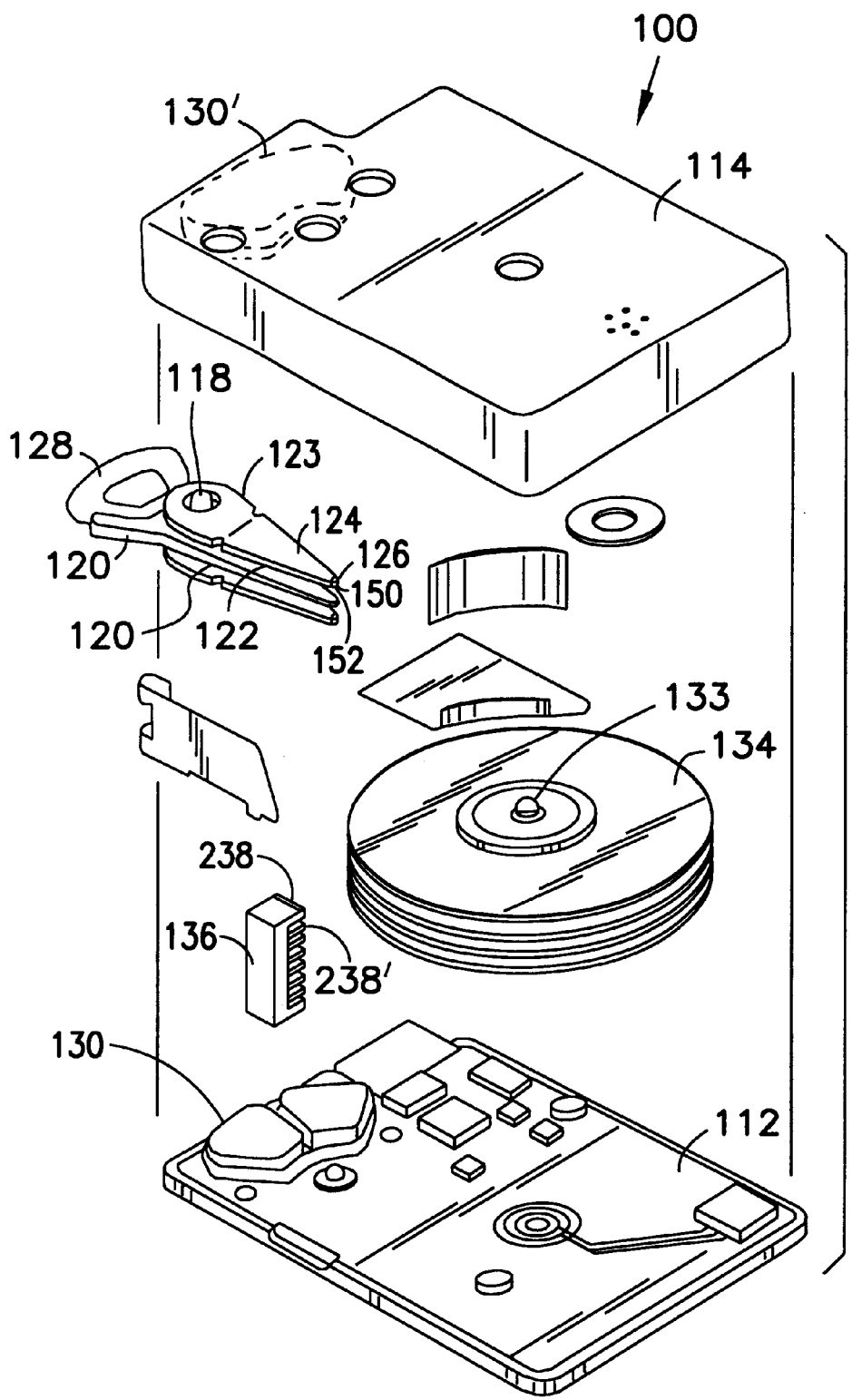
FIG. 1 is an exploded view of a disk drive with a multiple disk stack and a ramp assembly for loading and unloading transducers to and from the surfaces of the disks.

The invention described in this application is useful with all mechanical configurations of disk drives having either rotary or linear actuation. In addition, the invention is also useful in all types of disk drives including hard disk drives, zip drives, floppy disk drives and any other type of drives where unloading the transducer from a surface and parking the transducer may be desirable. FIG. 1 is an exploded view of one type of a disk drive 100 having a rotary actuator. The disk drive 100 includes a housing 112, and a housing cover 114. The housing 112 and housing cover 114 form a disk enclosure. Rotatably attached to the housing 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. Also attached to the load spring is a load tang 152. The load tang 152 is used for loading transducers to the disk and unloading the transducers from the disk. On the end of the actuator arm assembly 120 opposite the load springs 124 and the sliders 126 is a voice coil 128.

Attached within the housing 112 is a pair of magnets 130. The pair of magnets 130 and the voice coil 128 are key parts of a voice coil motor which applies a force to the actuator assembly 120 to rotate it about the actuator shaft 118. Also mounted to the housing 112 is a spindle motor 132. The spindle motor 132 includes a rotating portion called the spindle hub 133. In FIG. 1, a number of disks 134 are attached to the spindle hub 133. In other disk drives a single disk or a different number of disks may be attached to the hub. The invention described herein is equally applicable to such other disk drives.

Figure 2:
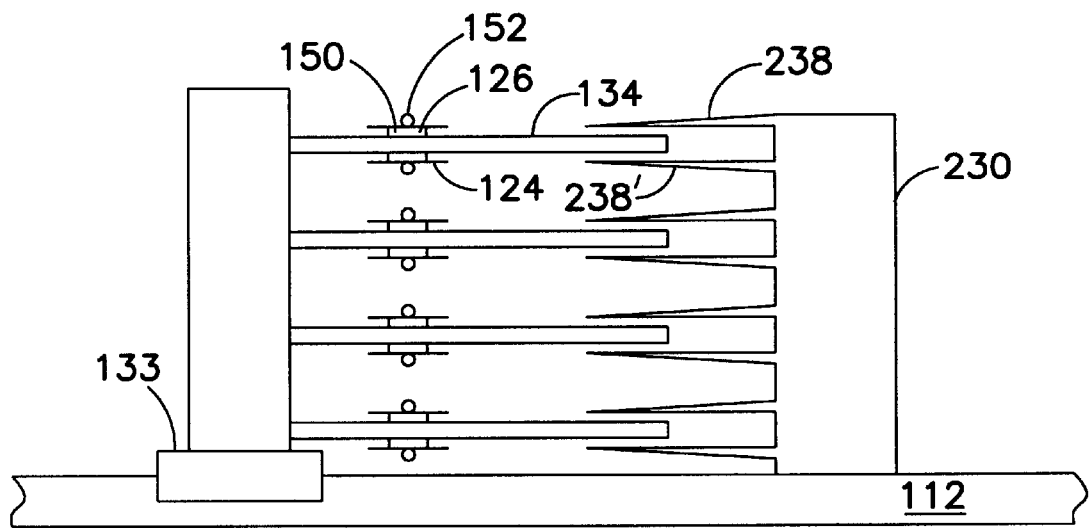
FIG. 2 is a side view of a disk drive having a ramp structure.

Also attached to the housing 112 is a ramp structure 136. FIG. 2 is a side view of a disk drive having a ramp structure. Now looking at FIG. 2, the ramp structure will be described in more detail. The ramp structure 136 has a plurality of individual ramps 238 and 238'. One ramp is associated with each surface of the disk. As shown, there is a ramp portion 238 for the top surface of a disk and a ramp 238' for a bottom surface of the disk 134. The ramp portion 238 is for the loading and unloading the transducer from the top surface of a disk 134 and the ramp portion 238' is for loading and unloading a transducer from the top surface of a disk 134. The disk drive shown in FIG. 2 has four disks with eight disk surfaces. Only one disk and set of ramps 238 and 238' are labeled. The other disks and ramps are similar to the labeled disk 134 and set of ramps 238 and 238'. The ramp structure 136 shown in FIG. 2 is fixed to the base of the disk drive. The ramp structure can be formed as one unitary part or can be assembled from a number of different parts. For example, the ramp structure 134 shown could be comprised of four parts. Each part would include a set of ramps 238 and 238' and a main body 230 to which the ramps 238 and 238' are attached. A portion of each of the ramp portions 238 and 238' of the ramp is positioned over the disk 134. It should be noted that this invention could also be used on ramps that rotate in and out of a load/unload position.

Also shown in FIG. 2 are the load springs 124 or suspensions and the attached load tangs 152 attached to the load springs 124. The slider 126 and transducer 150 carried by the slider are not illustrated in FIG. 2 for the sake of clarity. All the load springs 124 and tangs 152 are attached to the actuator. Moving the actuator moves all the load springs 124 and load tangs 152. In operation, the actuator is moved to a park position when the disk drive is powered down. Moving the actuator to the park position causes the load tangs 152 associated with each load spring 124 to ride up the ramp 238 or 238' associated with the surface of the disk. This is referred to as unloading the disk. When the disk drive is powered on, the actuator moves to an operating position by moving the load springs 124, load tangs 152, sliders and transducers off their respective ramps 238 or 238' into a transducing position over the surface of the disk 134. This is referred to as loading the disk. The load springs 124 and load tangs 152 are shown in a transducing position in FIG. 2.

Figure 3:
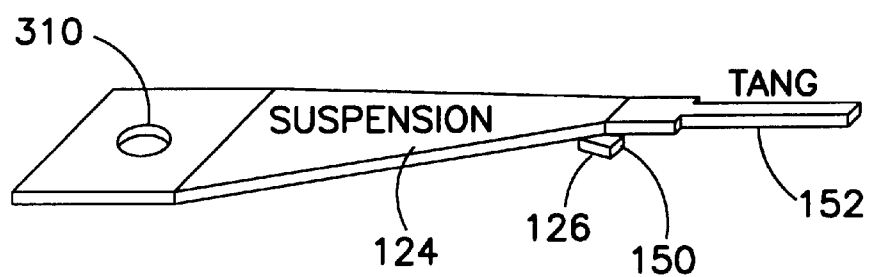
FIG. 3 is a perspective view of a load beam and load tang.

FIG. 3 is a perspective view of a load beam and load tang. The load beam 124 is a triangular structure which acts as a cantilevered spring to place a small load onto the slider 126 when the slider 126 is in transducing relationship with the disk 134. The slider 126 is attached at its wider end to an actuator arm. The load spring 124 shown in FIG. 3 has a swage opening 310 in the wider end. The swage opening 310 is used to attach the load spring 124 by a process referred to as swaging. Other attachment methods are also contemplated. The load tang 152 is attached to a free end 320 of the load spring 124. The load tang 152 is shown as an elongated cylinder. Also attached to the load spring 124 is the slider 126. The transducer 150 is carried by or within the load spring 124.

Figure 4:
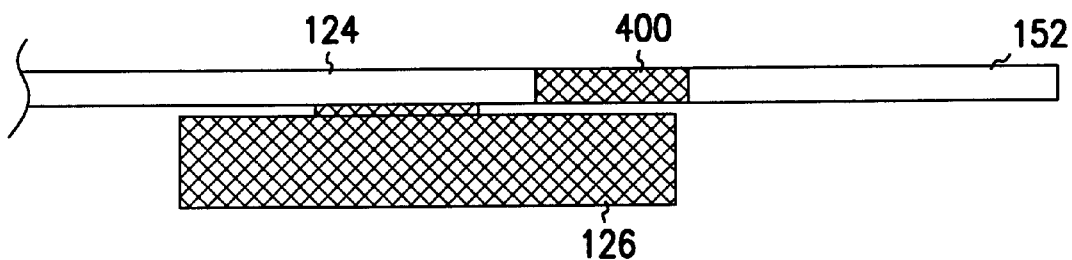
FIG. 4 is a side view of a load beam and load tang with a deformable region within the load tang.

FIG. 4 is a side view of a load spring 124 and attached load tang 152 shown with the load tang mounted on the end of the spring. The load tang 152 is attached to the load spring 124 by a deformable region 400. Also shown attached to the load spring 124 is the slider 126. The deformable region 400 is plastically deformable so as to provide for adjustment of the position of the load tang 152 with respect to the load spring 124 and the slider 126. Adjustments can be made so that the z-height of the load tang can be adjusted for mating with the ramp and so that the angle at which the slider and suspension ride up the ramp. There are many possible embodiments for the deformable region 400. The deformable portion 400 can be a formed stainless steel feature which allows for adjustment over the appropriate range. The deformable feature may also be made of different metals or different materials. A polymer or other plastically deformable material may be used. The deformable region could be attached to the tang or could be part of the tang. During assembly, the actuator would be moved to the park position and the load tangs would be adjusted so that the tangs 152 would be at appropriate z-heights with respect to their associated ramps 238 or 238', and so that the sliders would be at appropriate angles with respect to the disk 134. The adjustments would be made by deforming the deformable regions 400. Once deformed, the adjustments would remain.

Figure 5:
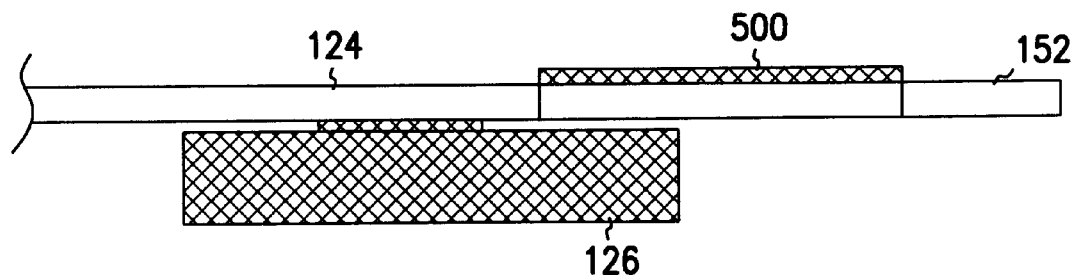
FIG. 5 is a side view of a load beam and load tang with a thermoset polymer applied to the load tang.

FIG. 5 is a side view of another embodiment of a load spring 124 and a load tang 152. Applied to the load tang 152 is a layer of thermoset polymer 500. As shown the layer of thermoset polymer 500 is attached to the top of the tang 152. The layer of thermoset polymer 500 could also be attached or applied to the bottom of the tang 152. The load tang 152 would pass through its elastic region in this embodiment. During assembly, the load tang 152 would be adjusted and then the thermoset polymer would be activated to hold it in the adjusted position. For example, after the ramp assembly is installed in the drive, the head stack assembly would be placed to the outer diameter. The actuator would then be moved further so that all the load tangs 152 would be in the park position. Adjustments to each of the individual load tangs could be made. When the entire actuator assembly is properly adjusted, the thermoset polymer could be heated and then allowed to cool while in the park position. The respective layers of thermoset polymers 500 would then hold the sliders and load tangs 152 in the adjusted position.

The heat for setting the layers of thermoset material 500 could be applied in any number of ways. Of course, one way would be to apply the heat generally to the entire disk drive, such as by placing the disk drive in an oven or other open air heating device. The heat could also be applied using a laser. One or more lasers could be positioned using a vision system to locate the layers of thermoset material 500. The lasers could then be pulsed to provide the necessary heat to the individual layers of thermoset materials 500. The use of lasers would not subject the entire disk drive to the heat necessary to set the individual layers of thermoset material 500. Another method would be to use a localized resistance heater to set the thermoset material 500.

Advantageously, ramp structures 136 can be used in disk drives having multidisk stacks. The adjustable load tangs 152 having either the deformable region 400 or the thermoset layer 500 allow for z-height adjustment of the tangs and tilt angle adjustment of the sliders 126.

Figure 6:
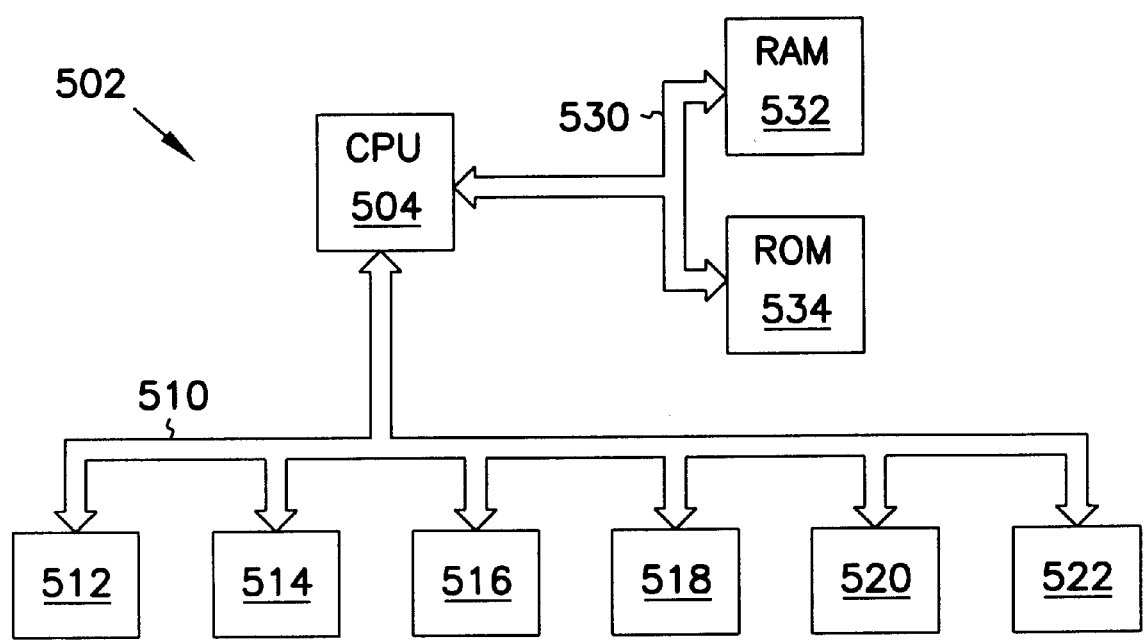
FIG. 6 is a schematic view of a computer system.

FIG. 6 is a schematic view of a computer system. Advantageously, the invention is well-suited for use in a computer system 502. The computer system 502 may also be called an electronic system or an information handling system and includes a central processing unit, a memory and a system bus. The information handling system includes a central processing unit 504, a random access memory 532, and a system bus 530 for communicatively coupling the central processing unit 504 and the random access memory 532. The information handling system 502 includes a disk drive device which includes the ramp described above. The information handling system 502 may also include an input/output bus 510 and several devices peripheral devices, such as 512, 514, 516, 518, 520, and 522 may be attached to the input output bus 510. Peripheral devices may include hard disk drives, magneto optical drives, floppy disk drives, monitors, keyboards and other such peripherals. Any type of disk drive may use the ramp having particles 300 molded therein.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A magnetic disk drive comprising:
   a transducer;
   a disk;
   an arm for carrying said transducer in transducing relation with respect to said disk;
   a ramp for loading and unloading the arm and transducer from said disk; and means for adjusting the arm with respect to said ramp and disk.

2. The magnetic disk drive of claim 1 wherein the means for adjusting the arm with respect to said ramp and disk made of a polymer.

3. The magnetic disk drive of claim 1 wherein the means for adjusting the arm with respect to said ramp and disk is made of a deformable material.

4. A magnetic disk drive comprising:
   a transducer;
   a disk;
   an arm for carrying said transducer in transducing relation with respect to said disk; and
   a ramp for loading and unloading the arm and transducer from said disk, said arm having a deformable region made of thermoset material for adjusting the arm with respect to said ramp and disk.

5. A magnetic disk drive comprising:
   a transducer;
   a disk;
   an arm;
   a load spring attached to said arm, said load spring and arm carrying said transducer in transducing relation with respect to said disk;
   a ramp for loading and unloading the arm and transducer from said disk; and
   a load tang attached to said load spring and having a deformable region for adjusting said arm with respect to said ramp and said disk.

6. The magnetic disk drive of claim 5 wherein the deformable portion is made of metal.

7. The magnetic disk drive of claim 5 further comprising a housing, said disks rotatably attached to said housing, said arm and load beam rotatably attached to said housing, and said ramp fixedly attached to said housing.

8. A magnetic disk drive comprising:
   a transducer;
   a disk;
   an arm;
   a load spring attached to said arm, said load spring and arm carrying said transducer in transducing relation with respect to said disk;
   a ramp for loading and unloading the arm and transducer from said disk; and
   an adjustable load tang attached to said load spring, said load tang is a deformable material, said deformable load tang further comprising a layer of thermoset material applied to the deformable material.

9. An information handling system comprising:
   a base;
   a disk rotatably attached to said base; and
   an actuator assembly movably attached to said base, said actuator assembly further comprising:
      a load spring;
      a transducer attached to said load spring; said actuator moving between a transducing position and a park position; and
      a load tang attached to said load spring; and a ramp attached to said base, said load tang riding along the surface of the ramp when the actuator moves the transducer between the transducing position and the park position, wherein said load tang has a deformable portion for adjusting said load spring with respect to said disk and said ramp.

10. The information handling system of claim 9 wherein the load tang further comprises a deformable portion.

11. The information handling system of claim 10 wherein the deformable portion is made of metal.

12. An information handling system comprising:
   a base;
   a disk rotatably attached to said base; and
   an actuator assembly movably attached to said base, said actuator assembly further comprising:
      a load spring;
      a transducer attached to said load spring; said actuator moving between transducing position and a park position; and
      an adjustable load tang including a deformable portion attached to said load spring, said load tang further comprising a layer of thermoset material applied to the deformable portion; and
      a ramp attached to said base, said adjustable load tang riding along the surface of the ramp when the actuator moves the transducer between the transducing position and the park position.

13. The information handling system of claim 12 wherein the disk drive further comprises a heat source for said layer of thermoset material to hold said load tang in the adjusted position.

14. A method for assembling a disk drive having a multiple disk stack and a ramp and an actuator having load springs with adjustable tangs, said assembly method comprising the steps of:
   moving the actuator to a position where the load springs engage the associated ramps of the ramp structure; and
   adjusting the load tangs by plastically deforming the deformable portion of said load tangs so the components are properly aligned.

15. The method of claim 14 wherein the step of adjusting the load tangs further comprises moving the load tangs to plastically deform a region of the load tang.

16. A method for assembling a disk drive having a multiple disk stack and a ramp and an actuator having load springs with adjustable tangs, said assembly method comprising the steps of:
   moving the actuator to a position where the load springs engage the associated ramps of the ramp structure;
   adjusting the deformable portion of the load tangs so the components are properly aligned;
   moving the load tangs to an adjusted position; and
   heating a thermoset material associated with the load tang to hold the load tang in the adjusted position.

17. The method of claim 16 wherein the step of heating a thermoset material associated with the load tang includes placing the disk drive in an oven.

18. The method of claim 16 wherein the step of heating a thermoset material associated with the load tang includes the steps of:

locating the thermoset material associated with the load tang; and heating the thermoset material with a laser.

19. The method of claim 16 wherein the step of heating a thermoset material associated with the load tang includes the steps of:

locating the thermoset material associated with the load tang; and heating the thermoset material with a localized resistance heater.

* * * * *

UNITED STATES PATENT AND TRADEMARK OFFICE
CERTIFICATE OF CORRECTION

PATENT NO.: 6,067,208
DATED: May 23, 2000
INVENTOR(S): Segar

It is certified that errors appear in the above-identified patent and that said Patent is hereby corrected as shown below:

In the abstract, line 29, delete "heated to allowed to cool", and insert --heated and allowed to cool--, therefor.

In column 3, line 56, delete "heated to allowed to cool", and insert --heated and allowed to cool--, therefor.

In column 5, line 5, delete "top surface" and insert --bottom surface--, therefor.

In column 7, lines 17-18, delete "disk made" and insert --disk is made--, therefor.

Signed and Sealed this

Twenty-second Day of May, 2001

Attest:

NICHOLAS P. GODICI

Attesting Officer

Acting Director of the United States Patent and Trademark Office